United States Patent [19]

Ohtsuki

[11] Patent Number: 5,034,236

[45] Date of Patent: Jul. 23, 1991

[54] PROCESS FOR THAWING FOODSTUFFS

[76] Inventor: Tatsukiyo Ohtsuki, 9-25, Saiwaicho, Okayama-shi, Japan

[21] Appl. No.: 539,060

[22] Filed: Jun. 15, 1990

[30] Foreign Application Priority Data

Jun. 30, 1989 [JP] Japan .................................. 1-168833

[51] Int. Cl.$^5$ .............................................. A23L 1/00
[52] U.S. Cl. ..................................... 426/244; 426/524
[58] Field of Search ....................... 426/234, 244, 524; 99/451

[56] References Cited

U.S. PATENT DOCUMENTS 3,383,218  5/1968  Jason et al. .......................... 426/244
3,505,490  4/1970  Jorn ..................................... 426/524

Primary Examiner—George Yeung
Attorney, Agent, or Firm—Ladas & Parry

[57] ABSTRACT

The present invention relates to a process for thawing food. More particularly, the present invention relates to a process for applying negative electron to food by the high voltage induced electrostatic method in order to thaw it rapidly at a low temperature in the range of −3° C.-3° C. According to the process of the present invention, general bacteria observed in the food thawed can be maintained negative and the weight loss caused by drip can be suppressed to a very low level.

1 Claim, 1 Drawing Sheet

PROCESS FOR THAWING FOODSTUFFS

FIELD OF THE INVENTION

The present invention relates to a process for thawing foodstuffs. More particularly, the present invention relates to a process for applying negative electron to foodstuffs by the high voltage induced electrostatic method to thaw it rapidly at a low temperature in the range of −3° to 3° C.

DESCRIPTION OF THE PRIOR ART

When frozen food is thawed, it is desirable to thaw it carefully so that the values of its materials is maintained and not only its color or taste but also its appearance will now be impaired.

Conventional thawing methods include thawing methods such as exposing frozen food to warmed air and flowing water or a high speed thawing with an electric heating source or high-frequency wave. These methods, however, have disadvantages that the frozen food is often heated to an unexpected high temperature so that the freshness of the frozen food is lost to cause the discoloration of the food or the propagation of various germs.

As mentioned above, conventional methods inevitably raises the temperature of the frozen food and lowers its freshness thus causing the deterioration of its value as food. Therefore, it is earnestly desired to find a method for rapidly thawing frozen food without raising the temperature of frozen food.

SUMMARY OF THE INVENTION

The present invention is a process for overcoming the aforementioned problem and thawing frozen food characterized in that the inside of a thawing chamber is completely insulated from the outside of it, a shelf made of stainless steel plate (conductor) is provided therein, so that a food to be thawed is placed on the shelf and thawed with use of a negative electron generater by the elctrostatic induction method.

DESCRIPTION OF THE PREFERRED EMBODIMENTS

Figure 1:
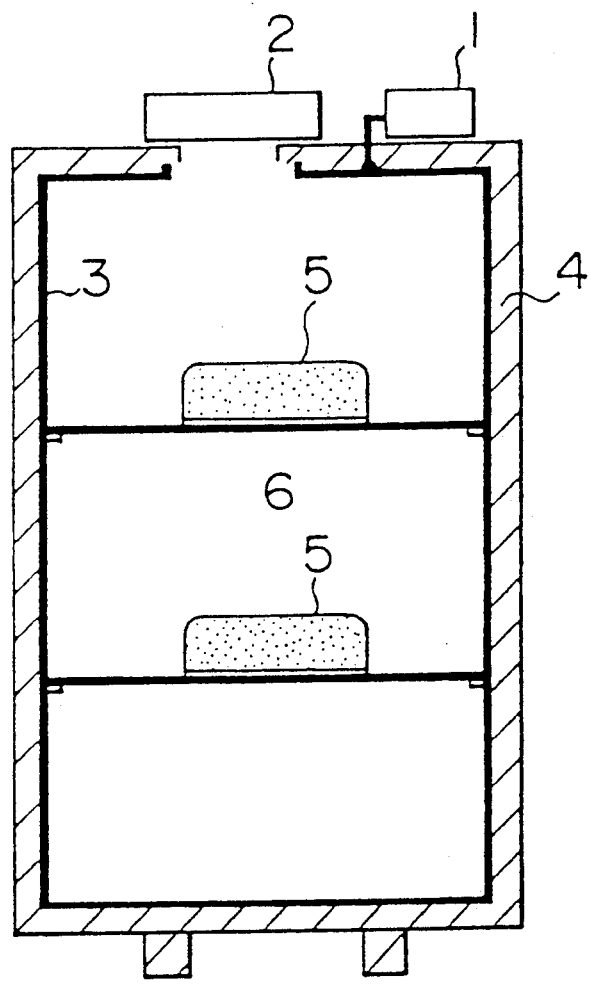
FIG. 1 is a sectional view of a thawing apparatus used in the present invention.
1. negative electron generater,
2. freezer,
3. conductive part,
4. insulating part,
5. frozen food,
6. thawing chamber.

As mentioned above, it has become possible to thaw rapidly and uniformly the whole of the food to be thawed at a temperature in the range of −30° C.-3° C. without raising its temperature by applying negative electron generated by electrostatic induction to the inside of a thawing chamber according to the process of the present invention. Moreover, the process according to the present invention is superior in sterilization effect and can keep food cool without the discoloration or fading and with little dripping.

The method for generating negative electron by electrostatic induction according to the present invention is a method which is conducted, for example, by using a high voltage transducer, insulating an electrode at the secondary high voltage side, connecting another electrode to a shelf made of an electroconductive metal such as an iron or stainless steel plate and applying negative electron by electrostatic induction. In this connection, it is necessary to insulate completely all of the accessories.

The negative electron generating condition in the present invention is most preferably of a current value in the primary side of 100 V of a high voltage transducer in the range of 0.02 A–0.3 A per 1 m² of the area of the electrode with the secondary voltage for satisfying the primary voltage being required to be in the design range of 5000 V–20,000 V.

The negative electron generating condition according to the present invention can be controlled by the primary current. However, if the primary current is of a value at most 0.02 A/m² of the area of the electrode, the effect of the present invention is not conspicuous. Also, if the primary current is of a value of 0.3 A or more, the effect is not increased so much.

Negative electron shall be generated under the aforementioned condition according to the electrostatic induction of the present invention.

EXAMPLE

The present invention is explained by an example referring to the drawings.

As illustrated in FIG. 1, the inside of the thawing chamber according to the present invention is completely insulated from the outside and an electrode at the primary side of a negative electron generator 1 with use of electrostatic induction is connected to the inside 3 of a thawing chamber so that negative electron can be applied to the inside. In this connection, the inside of the thawing chamber is connected to a shelf by a fastening and thus the two parts is in the state of communication.

The temperature within the chamber 6 is set at −3° C.-3° C.

A food to be thawed is placed on the shelf and thawing is started by turning on the switch of a negative electron generator 1.

Thawing tests were conducted within the apparatus according to the present invention provided in a refrigerator or at an ambient temperature with reference to tuna fish meat, beef and an egg.

(1) Test of tuna meat piece

Thawing was carried out with the apparatus according to the present invention (condition: 0.009 A, 15,000 V) and with a refrigerator as a control.

TABLE 1-1

| Thawing method | Thawing temperature (°C.) | Thawing (hr) | Germs (number/cc) General germs | E. coli | Drip amount (g) | Weight reduction (%) |
|---|---|---|---|---|---|---|
| 1* | −3 | 10 | $1.8 \times 10^3$ | negative | 0 | 0 |
| 1* | −1∼3 | 8 | $1.9 \times 10^4$ | negative | 0 | 0 |
| 2** | −3 | 45 | $2.0 \times 10^6$ | $4.0 \times 10^2$ | 25 | 2.5 |
| 2** | −1∼3 | 32 | $3.1 \times 10^6$ | $4.1 \times 10^2$ | 30 | 3.0 |

(Weight of food to be thawed: 1.000 g)
*Apparatus according to the present invention,
**Refrigerator.

TABLE 1-2

| Thawing method | Thawing temperature (°C.) | Thawing (hr) | Germs (number/cc) General germs | E. coli | Drip amount (g) | Weight reduction (%) |
|---|---|---|---|---|---|---|
| 1* | −3 | 15 | $1.9 \times 10^3$ | negative | 0 | 0 |
| 1* | −1∼3 | 12 | $1.8 \times 10^4$ | negative | 0 | 0 |
| 2** | −3 | 90 | $3.0 \times 10^6$ | $3.9 \times 10^2$ | 75 | 1.5 |
| 2** | −1∼3 | 72 | $3.3 \times 10^6$ | $4.1 \times 10^2$ | 100 | 2.0 |

(Weight of food to be thawed: 5.000 g)
*Apparatus according to the present invention,
**Refrigerator.

The result of the thawing test of tuna meat pieces is shown in Table 1-1 and 1-2. That is, the tuna meat piece could be thawed in a time of ¼-1/6 in the apparatus according to the present invention as compared with that in the refrigerator at the same temperature, and the general germs could be suppressed to the level of 1/180-1/1600 in the apparatus according to the present invention as compared with those in the refrigerator. Moreover, E. coli was not detected in the test with use of the apparatus according to the present invention.

The amount of drip, that is, the weight reduction rate was 0 in the apparatus according to the present invention, while 1.5-3% in the refrigerator.

(2) Test of beef piece

Test was conducted with the apparatus according to the present invention and the refrigerator.

TABLE 2-1

| Thawing method | Thawing temperature (°C.) | Thawing (hr) | Germs (number/cc) General germs | E. coli | Drip amount (g) | Weight reduction (%) |
|---|---|---|---|---|---|---|
| 1* | −3 | 10 | $4.0 \times 10^2$ | negative | 0 | 0 |
| 1* | −1∼3 | 8 | $7.5 \times 10^2$ | negative | 0 | 0 |
| 2** | −3 | 30 | $1.3 \times 10^4$ | negative | 20 | 2.0 |
| 2** | −1∼3 | 24 | $1.5 \times 10^4$ | negative | 20 | 2.0 |

(Weight of food to be thawed: 1.000 g)

TABLE 2-2

| Thawing method | Thawing temperature (°C.) | Thawing (hr) | Germs (number/cc) General germs | E. coli | Drip amount (g) | Weight reduction (%) |
|---|---|---|---|---|---|---|
| 1* | −3 | 15 | $5.0 \times 10^2$ | negative | 0 | 0 |
| 1* | −1∼3 | 12 | $8.0 \times 10^2$ | negative | 0 | 0 |
| 2** | −3 | 60 | $1.5 \times 10^4$ | negative | 50 | 1.0 |
| 2** | −1∼3 | 48 | $1.7 \times 10^4$ | negative | 75 | 1.5 |

(Weight of food to be thawed: 5.000 g)
*Apparatus according to the present invention,
**Refrigerator.

The result of the thawin9 test of beef pieces is shown in Table 1-1 and 1-2. That is, the tuna meat piece could be thawed in a time of ¼-1/6 in the apparatus according to the present invention as compared with that in the refrigerator at the same temperature, and the general germs could be suppressed to the level of 1/20-1/30 in the apparatus according to the present invention as compared with those in the refrigerator. Moreover, the amount of drip, that is, the weight reduction rate was 0 in the apparatus according to the present invention, while 1-2% in the refrigerator.

(3) Test of yolk

The test was conducted with the apparatus according to the present invention and the refrigerator.

TABLE 3

| Thawing method | Thawing temperature (°C.) | Thawing time (hr) | Germs (number/cc) General germs | E. coli |
|---|---|---|---|---|
| 1* | −3 | 12 | 10 or less | negative |
| 1* | −1∼3 | 10 | 10 or less | negative |
| 2** | 5 | 24 | $1.7 \times 10$ | negative |
| 3*** | 5∼10 | 10 | $1.4 \times 10$ | negative |

(Weight of food to be thawed: 1.800 g)
*Apparatus according to the present invention,
**Refrigerator.
***Ambient temperature.

(4) Test of the weight of eggs

The test was conducted with the apparatus according to the present invention and the refrigerator.

TABLE 4

| Thawing method | Thawing temperature (°C.) | Thawing time (hr) | Germs (number/cc) General germs | E. coli |
|---|---|---|---|---|
| 1* | −3 | 35 | 10 or less | negative |
| 1* | −1∼3 | 30 | $3.5 \times 10$ | negative |
| 2** | 5 | 60 | $6.7 \times 10^2$ | negative |
| 3*** | 5∼12 | 30 | $8.7 \times 10^2$ | negative |

(Weight of food to be thawed: 1.800 g)
*Apparatus according to the present invention,
**Refrigerator.
***Ambient temperature.

Effect of the Invention

It was found that the present invention with use of the generation of negative electron by electrostatic induction as the thawing means can smoothly conduct heat exchange between the inside and the outside of a frozen food without raising temperature of the food.

Therefore, the thawing time could be shortened to ¼-⅓ at the same temperature condition.

Moreover, frozen food could be thawed without the raise of the temperature and thus dripping from the food was not observed in the case of the apparatus of the present invention.

It was also found that the apparatus of the present invention is excellent in sterilizing effect, the proliferation of germs can be suppressed and at the same time the thawed food can be matured, so that the thawed food is preserved in the fresh state for a long period.

What is claimed is:

1. A process for thawing a frozen food comprising disposing the food to be thawed on a conductive first electrode and applying an electric potential to said first electrode in the range of 5000 to 20,000 volts, and generating said electric potential by means of a high voltage transducer including a primary side to which a supply voltage is applied and a secondary side having second and third electrodes between which said potential is generated, said second and third electrodes being open-circuited and said third electrode being connected to said first-electrode, and applying current to said primary side in he range of 0.02-0.3 amperes per square meter of said first electrode.

* * * * *